(12) United States Patent
Bauman

(10) Patent No.: US 7,293,529 B2
(45) Date of Patent: Nov. 13, 2007

(54) KENNEL SYSTEM

(76) Inventor: Raymond J. Bauman, 13901 River Rd., Providence Township, OH (US) 43522

( * ) Notice: Subject to any disclaimer, the term of this patent is extended or adjusted under 35 U.S.C. 154(b) by 139 days.

(21) Appl. No.: 11/026,143

(22) Filed: Dec. 30, 2004

(65) Prior Publication Data
US 2005/0115513 A1 Jun. 2, 2005

Related U.S. Application Data

(63) Continuation-in-part of application No. 10/212,591, filed on Aug. 5, 2002, now Pat. No. 6,854,424.

(51) Int. Cl.
*A01K 1/02* (2006.01)

(52) U.S. Cl. .............. 119/482; 119/456; 119/458; 119/527

(58) Field of Classification Search .......... 119/482, 119/452, 455, 456, 458, 479, 527, 509, 450, 119/462, 463, 166, 165, 161
See application file for complete search history.

(56) References Cited

U.S. PATENT DOCUMENTS

| | | | | |
|---|---|---|---|---|
| 2,523,615 A | * | 9/1950 | Fell | 119/442 |
| 2,577,188 A | * | 12/1951 | Hall | 184/106 |
| 2,857,880 A | * | 10/1958 | Stone, Jr. | 119/479 |
| 3,047,147 A | * | 8/1962 | McKean | 119/496 |
| 3,177,848 A | * | 4/1965 | Rubricius | 119/458 |
| 3,225,738 A | * | 12/1965 | Palencia | 119/455 |
| 3,292,582 A | * | 12/1966 | Rubricius | 119/458 |
| 3,429,297 A | * | 2/1969 | Schroer | 119/417 |
| 3,464,388 A | * | 9/1969 | Stout | 119/418 |
| 3,550,558 A | | 12/1970 | Sachs | |
| 3,658,031 A | * | 4/1972 | Coe | 119/457 |
| 3,662,713 A | | 5/1972 | Sachs | |
| 3,662,714 A | | 5/1972 | Poon | |
| 3,738,325 A | * | 6/1973 | Wittern et al. | 119/457 |
| 3,779,210 A | * | 12/1973 | Blair | 119/457 |
| 3,895,606 A | | 7/1975 | Galloway | |
| 3,905,333 A | * | 9/1975 | Uhrig | 119/479 |
| 3,951,106 A | | 4/1976 | Wright | |
| 4,201,153 A | * | 5/1980 | Nace | 119/224 |
| 4,252,082 A | | 2/1981 | Herring | |
| 4,402,282 A | | 9/1983 | Steidinger | |
| RE31,556 E | | 4/1984 | Buchanan | |
| 4,532,891 A | * | 8/1985 | Jones | 119/61.54 |
| 4,660,506 A | * | 4/1987 | Nalven | 119/163 |
| 4,696,259 A | | 9/1987 | Fewox | |
| 4,794,897 A | | 1/1989 | Kinouchi | |

(Continued)

FOREIGN PATENT DOCUMENTS

FR 000545539 A 10/1922

(Continued)

*Primary Examiner*—Yvonne R. Abbott
(74) *Attorney, Agent, or Firm*—MacMillan, Sobanski & Todd, LLC

(57) ABSTRACT

A kennel system having a floor assembly including at least one floor unit having a floor pan and a grate. The floor pan has a drain, an integral water receptacle and a trough for guiding fluid to the drain. The grate is positioned over the floor pan. The grate has a plurality of grate opening for the flow of fluid through the grate to the floor pan.

24 Claims, 14 Drawing Sheets

U.S. PATENT DOCUMENTS

| | | | |
|---|---|---|---|
| 4,838,204 A * | 6/1989 | Young | 119/471 |
| 4,869,206 A * | 9/1989 | Spina | 119/417 |
| 4,998,506 A * | 3/1991 | Frostad | 119/475 |
| 5,116,256 A | 5/1992 | Allen | |
| 5,148,771 A * | 9/1992 | Schuett et al. | 119/479 |
| 5,335,617 A * | 8/1994 | Hoffman | 119/479 |
| 5,410,987 A * | 5/1995 | Simmons | 119/166 |
| 5,476,066 A | 12/1995 | Hoffman | |
| 5,515,812 A * | 5/1996 | Faust | 119/166 |
| 5,531,186 A * | 7/1996 | Flood et al. | 119/166 |
| 5,582,134 A * | 12/1996 | Simmons | 119/166 |
| 5,666,905 A | 9/1997 | Mackin et al. | |
| 5,732,658 A * | 3/1998 | Wolters et al. | 119/450 |
| 5,749,321 A * | 5/1998 | Ikuse et al. | 119/458 |
| 5,771,841 A * | 6/1998 | Boor | 119/452 |
| 5,791,288 A * | 8/1998 | Ehrler | 119/163 |
| 6,021,739 A | 2/2000 | Allen | |
| 6,138,609 A * | 10/2000 | Gordon | 119/166 |
| 6,152,080 A | 11/2000 | Allen | |
| 6,182,610 B1 * | 2/2001 | Tripp et al. | 119/450 |
| 6,237,720 B1 * | 5/2001 | Sutton | 184/106 |
| 6,293,229 B1 * | 9/2001 | Edstrom, Sr. | 119/482 |
| 6,568,350 B1 | 5/2003 | Savard et al. | |
| 6,854,424 B2 | 2/2005 | Bauman | |
| 2004/0020445 A1 | 2/2004 | Bauman | |
| 2004/0079040 A1 * | 4/2004 | MacLean et al. | 52/302.1 |
| 2006/0249090 A1 * | 11/2006 | Ahad | 119/163 |

FOREIGN PATENT DOCUMENTS

| | | |
|---|---|---|
| FR | 001204089 A | 1/1960 |

* cited by examiner

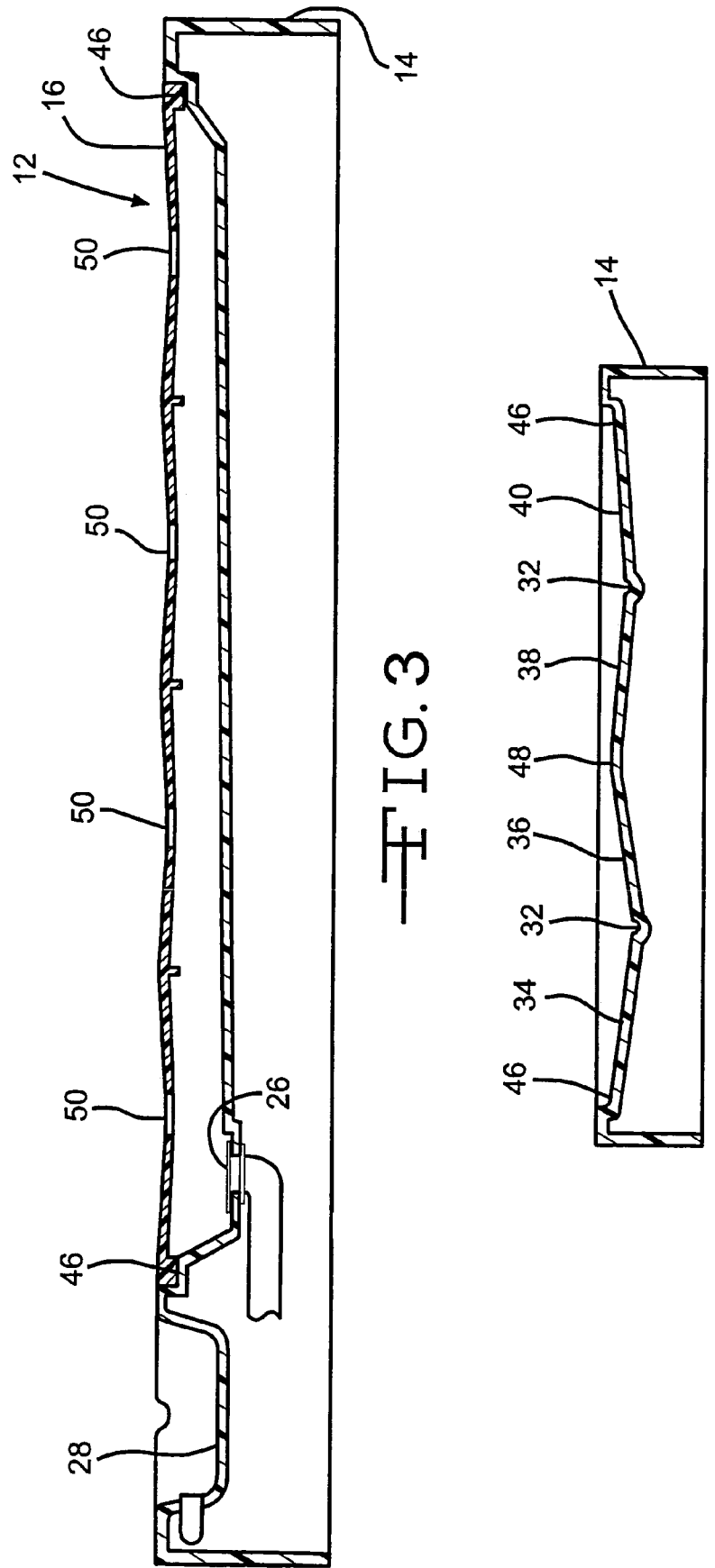

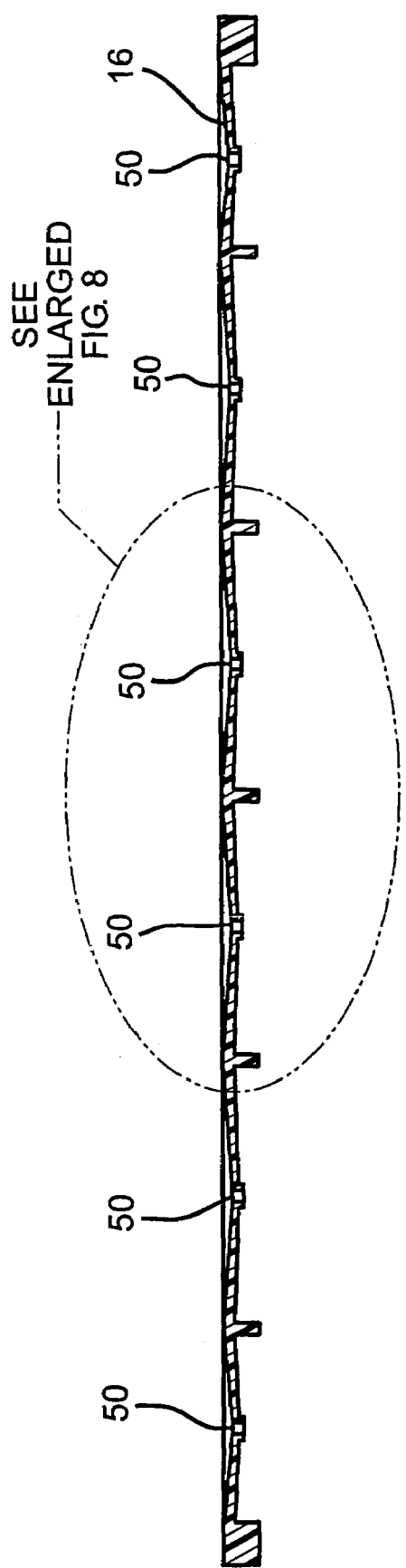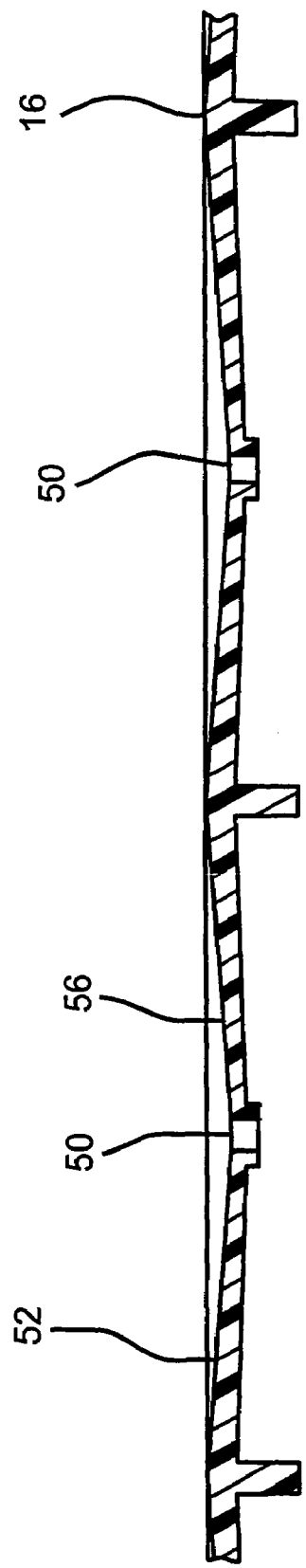

KENNEL SYSTEM

CROSS-REFERENCE TO RELATED APPLICATION

This is a continuation-in-part of U.S. patent application Ser. No. 10/212,591, filed on Aug. 5, 2002 now U.S. Pat. No. 6,854,424.

STATEMENT REGARDING FEDERALLY SPONSORED RESEARCH OR DEVELOPMENT

Not Applicable.

TECHNICAL FIELD

The present invention relates to animal housing. More specifically, the invention is directed to a kennel system.

BACKGROUND OF THE INVENTION

Prior kennel structures include various types of flooring, cages and drainage systems. However, it has been found that there is a need for a modular kennel system that can be efficiently assembled and disassembled. There is also a need for a kennel floor unit that is constructed of a durable and lightweight moldable material. There is a need for a floor unit that is easy to maintain. Further, there is a need for a kennel system having lower and upper levels in which the floor assembly includes structural support walls for the upper level. The present invention provides a kennel system that satisfies these and other needs.

SUMMARY OF THE INVENTION

The present invention is directed to a kennel system having a floor assembly including at least one floor unit having a floor pan and a grate. The floor pan has a drain, an integral water receptacle and a trough for guiding fluid to the drain. The grate is positioned over the floor pan. The grate has a plurality of grate openings for the flow of fluid through the grate to the floor pan.

The primary object of the present invention is to provide a modular kennel system that can be efficiently assembled and disassembled.

An important object of the present invention is to provide a kennel floor unit that is constructed of a durable and lightweight moldable material.

An important object of the present invention is to provide a kennel floor unit that is easy to maintain.

An important object of the present invention is to provide a kennel system having lower and upper levels in which the floor assembly includes structural support walls for the upper level.

Other objects and advantages of the present invention will become apparent to those skilled in the art upon a review of the following detailed description of the invention and the accompanying drawings.

BRIEF DESCRIPTION OF THE DRAWINGS

FIG. 3 is a cross-sectional view taken along line 3-3 of FIG. 1;

FIG. 4 is a cross-sectional view taken along line 4-4 of FIG. 2;

FIG. 7 is a cross-sectional view taken along line 7-7 of FIG. 5;

FIG. 8 is an enlarged view of the grate as indicated in FIG. 7;

DETAILED DESCRIPTION OF THE INVENTION

Figure 1:
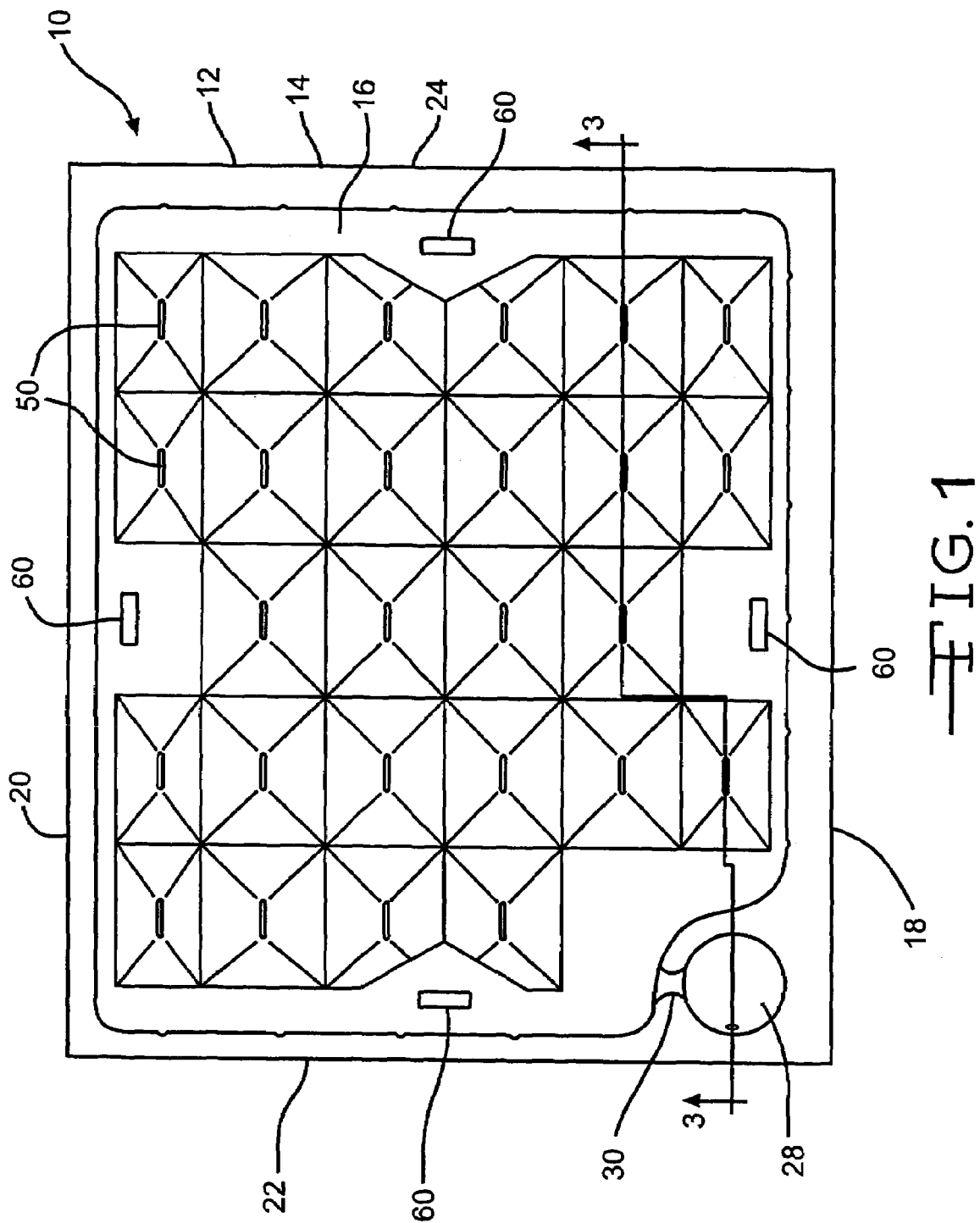
FIG. 1 is a top plan view of a floor unit according to the present invention.

The preferred embodiments and best mode of the present invention will now be described in detail with reference being made to the drawings. In the drawings, the kennel system of the present invention is indicated generally by the reference number "10".

Referring to FIGS. 1-8, the kennel system 10 has a floor unit 12 including a floor pan 14 and a grate 16. The floor pan 14 and the grate 15 are constructed of a durable and lightweight moldable material such as structural foam plastic or poured plastic.

Figure 2:
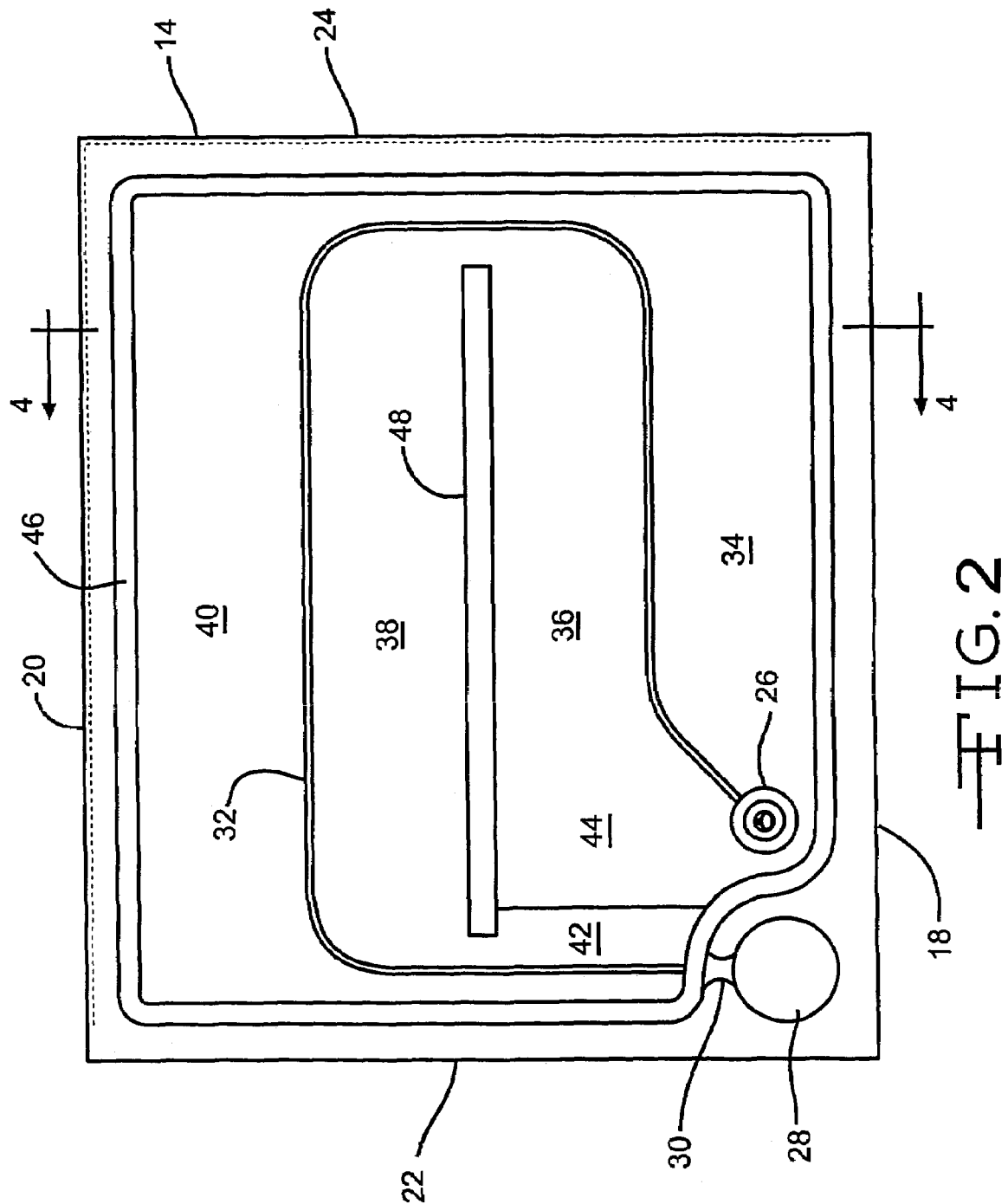
FIG. 2 is a is a top plan view of a floor pan according to the present invention.

As shown in FIGS. 2-4, the floor pan 14 has a front 18, a back 20, a first side 22 and a second side 24. A drain 26 for the discharge of fluid such as urine and water to a sewage system is positioned adjacent to the front 18. The floor pan 14 includes an integral water receptacle or bowl 28 having an overflow channel 30 positioned adjacent to the front 18 and the first side 22. The floor pan 14 has a trough 32 that extends gradually downwardly from the overflow channel 30 along the first side 22 toward the back 20 to the second side 24 toward the front 18 to the drain 26. The trough 32 guides fluid to the drain 26. As shown in FIGS. 2 and 4, the floor pan 14 has a first sloped portion 34, a second sloped portion 36, a third sloped portion 38, a fourth sloped portion 40, a fifth sloped portion 42 and sixth sloped portion 44 for guiding fluid to the trough 32.

Referring to FIGS. 2-4, the floor pan 14 has a continuous grate lip 46 that extends along the front 18, the first side 22, the back 20 and the second side 24. An elongated grate ridge 48 is positioned at the center of the floor pan 14. The grate lip 46 and the grate ridge 48 act as structural bearings for supporting the grate 16 on the floor pan 14.

Figure 5:
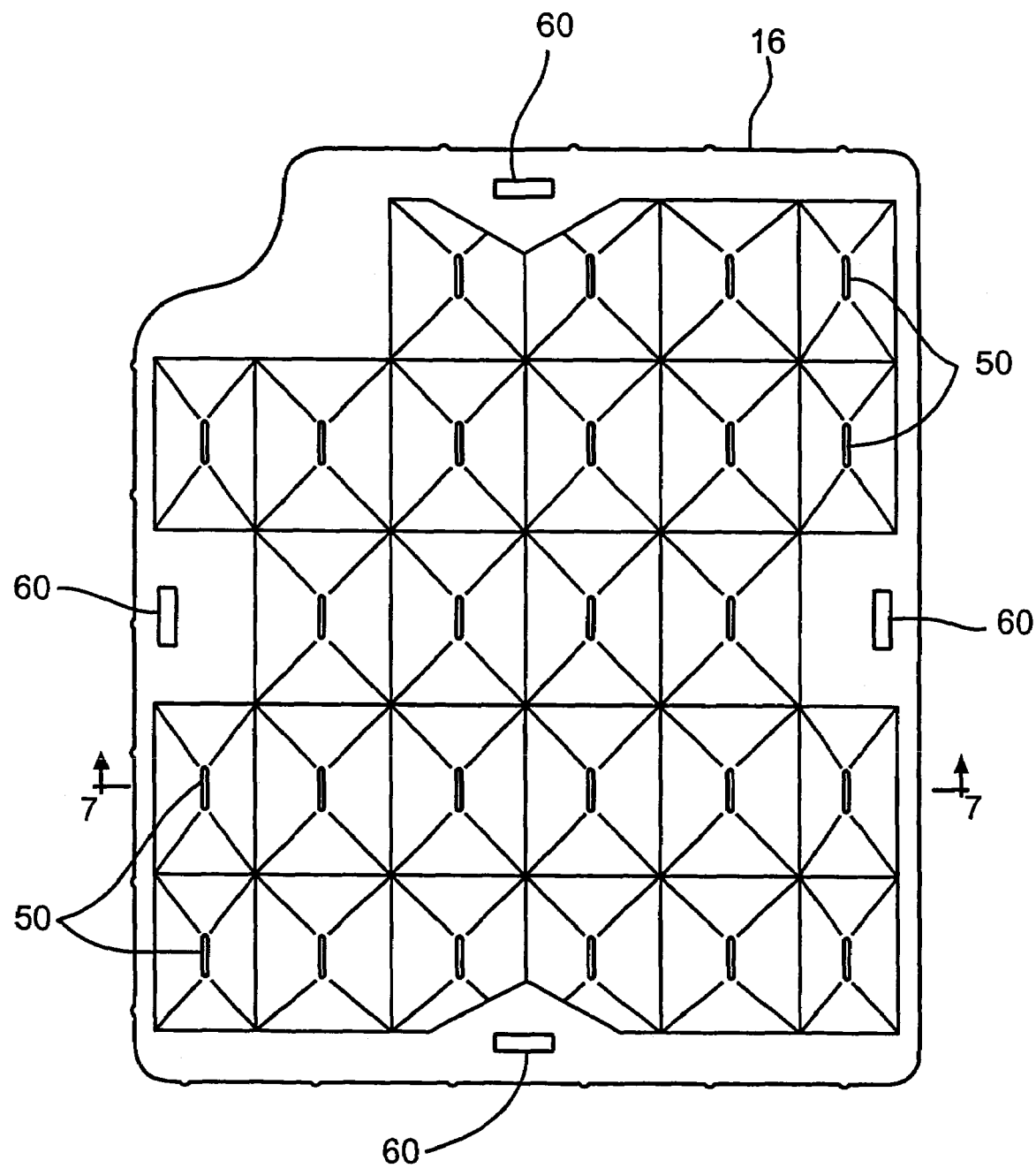
FIG. 5 is a top plan view of a grate according to the present invention.
Figure 6:
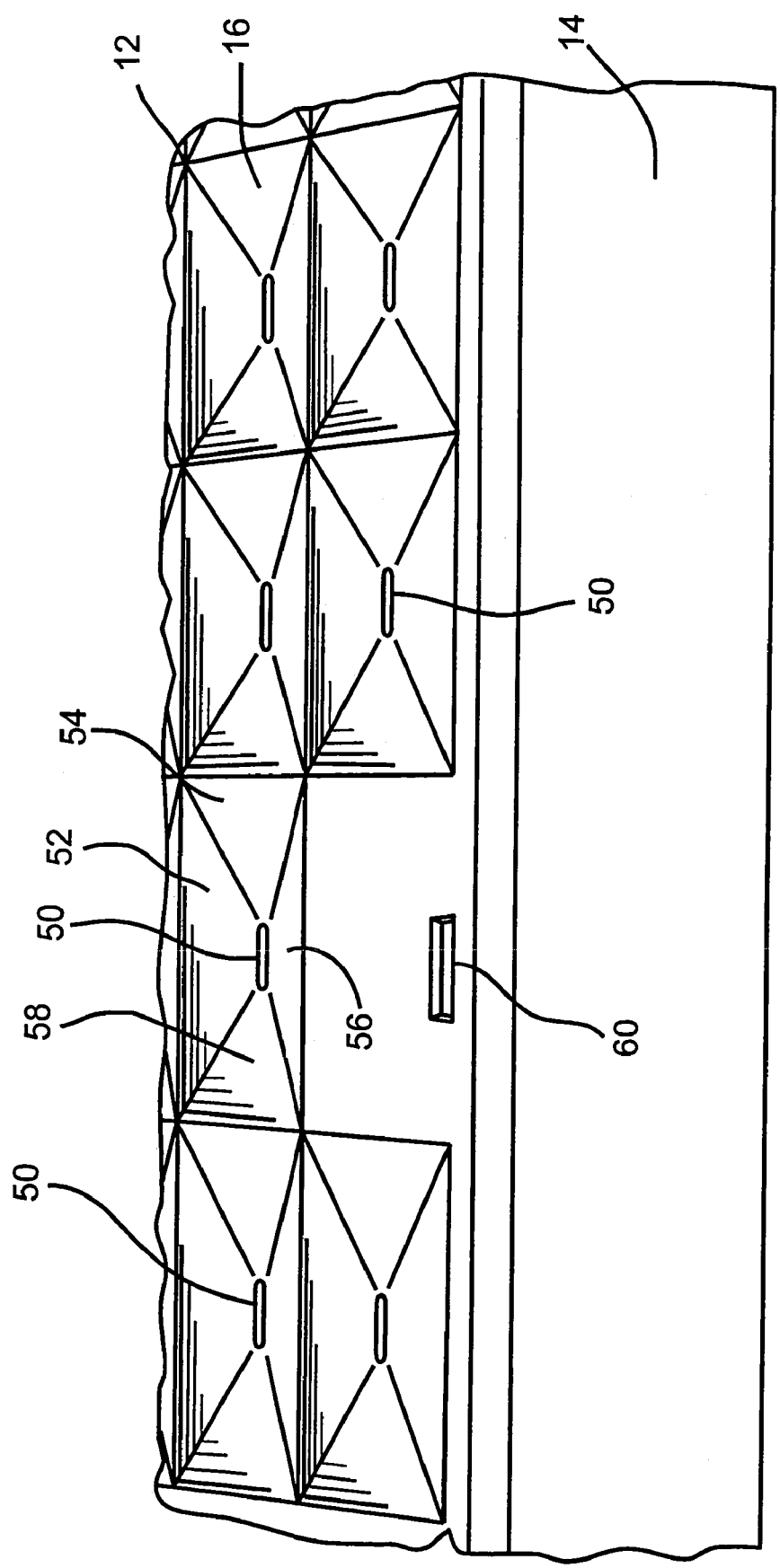
FIG. 6 is a perspective view of a portion of the floor unit showing the floor pan and the grate.

Referring to FIGS. 5-8, the grate 16 has a plurality of openings or elongated slots 50 for the flow of fluid through the grate 16 to the floor pan 14. As shown in FIG. 6, each slot 50 is positioned at the bottom of first, second, third and fourth fluid guiding sloped surfaces 52, 54, 56 and 58, respectively, which guide fluid to the slot 50. As shown in FIG. 5, the grate 16 includes four handholds 60.

The floor unit 12 of the present invention can have a variety of shapes and sizes depending on the use for the kennel system 10. For example, the floor unit 12 can range in floor space from 20 to 35 square feet. Two or more floor units 12 can be combined to provide floor space in the range from 40 to 70 square feet.

Figure 9:
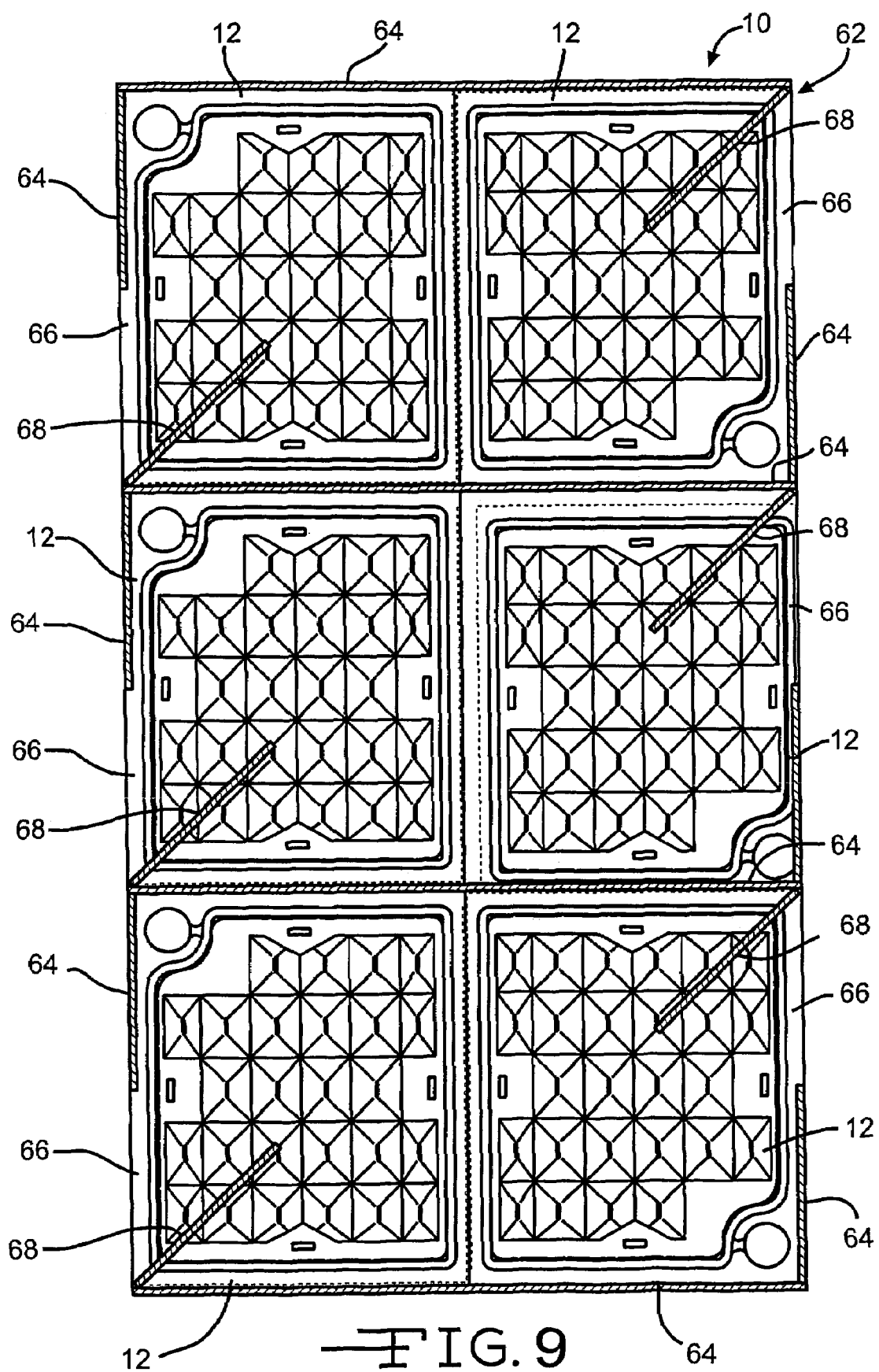
FIG. 9 is a top plan view of a floor assembly for a lower level according to the present invention.
Figure 10:
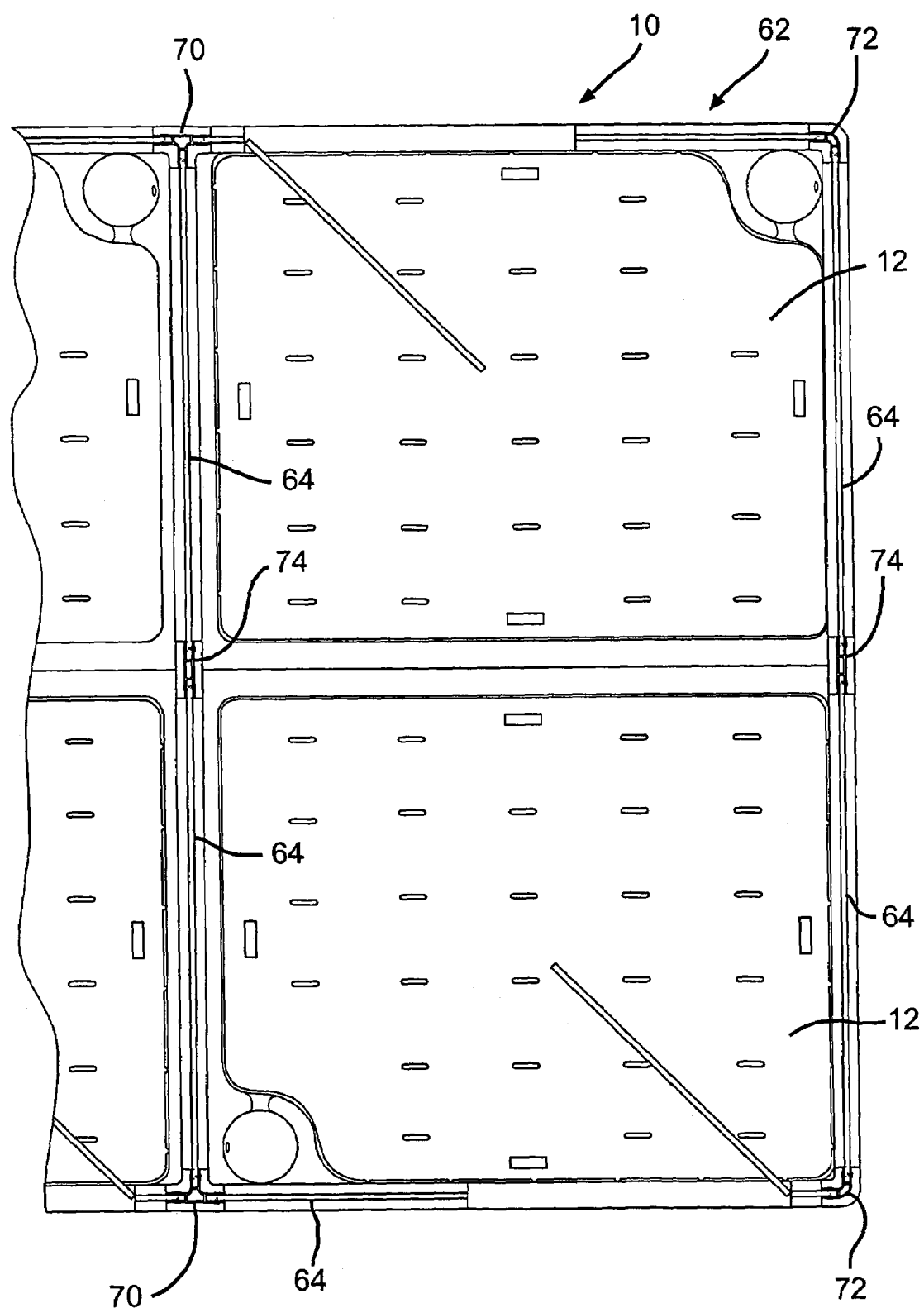
FIG. 10 is a top plan view of a portion of the lower level showing walls and connectors according to the present invention.

Referring to FIGS. 9-16, the kennel system 10 of the present invention has a floor assembly that is generally indicated by the reference number "62". The floor assembly 62 includes one or more floor units 12. As shown in FIG. 9, the floor assembly 62 has six floor units 12 positioned immediately adjacent to one another. The floor assembly 62 includes walls 64, access openings 66 and doors 68. Each floor unit 12 is surrounded by two or more walls 64, has an access opening 66 and a door 68. The floor assembly 62 can also include optional divider panels (not shown) to separate two combined floor units 12. The walls 64, doors 68 and divider panels can be constructed of a variety of materials such as wood, glass, metal or plastic. As shown in FIG. 10, the walls 64 are connected together and held in position by connectors such as tee splines 70, corner splines 72 and side splines 74. The floor assembly can also include a cross spline (not shown) for use with four walls 64.

Figure 11:
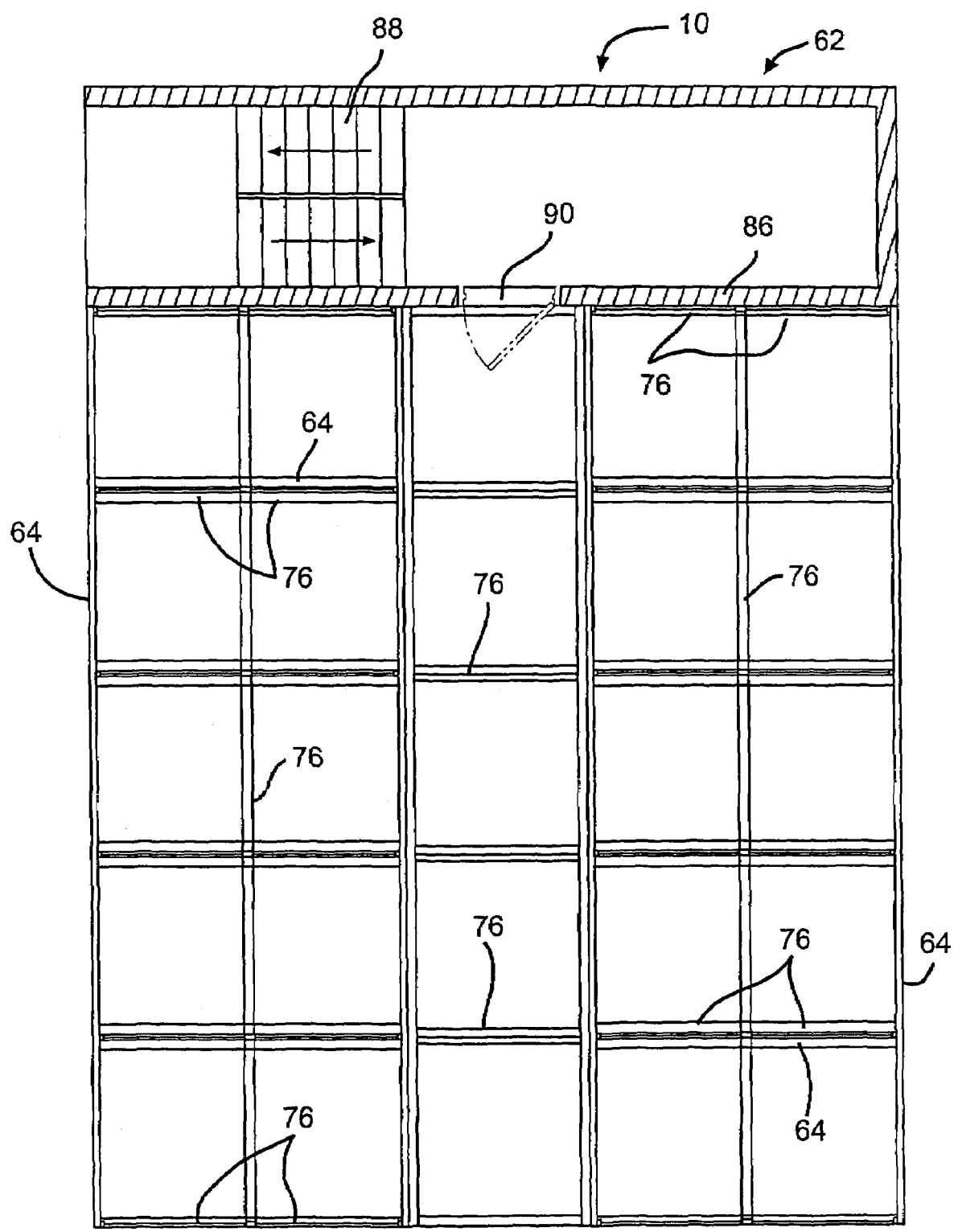
FIG. 11 is a top plan view of a floor assembly having walls, structural supports and stairs for an upper level according to the present invention.
Figure 12:
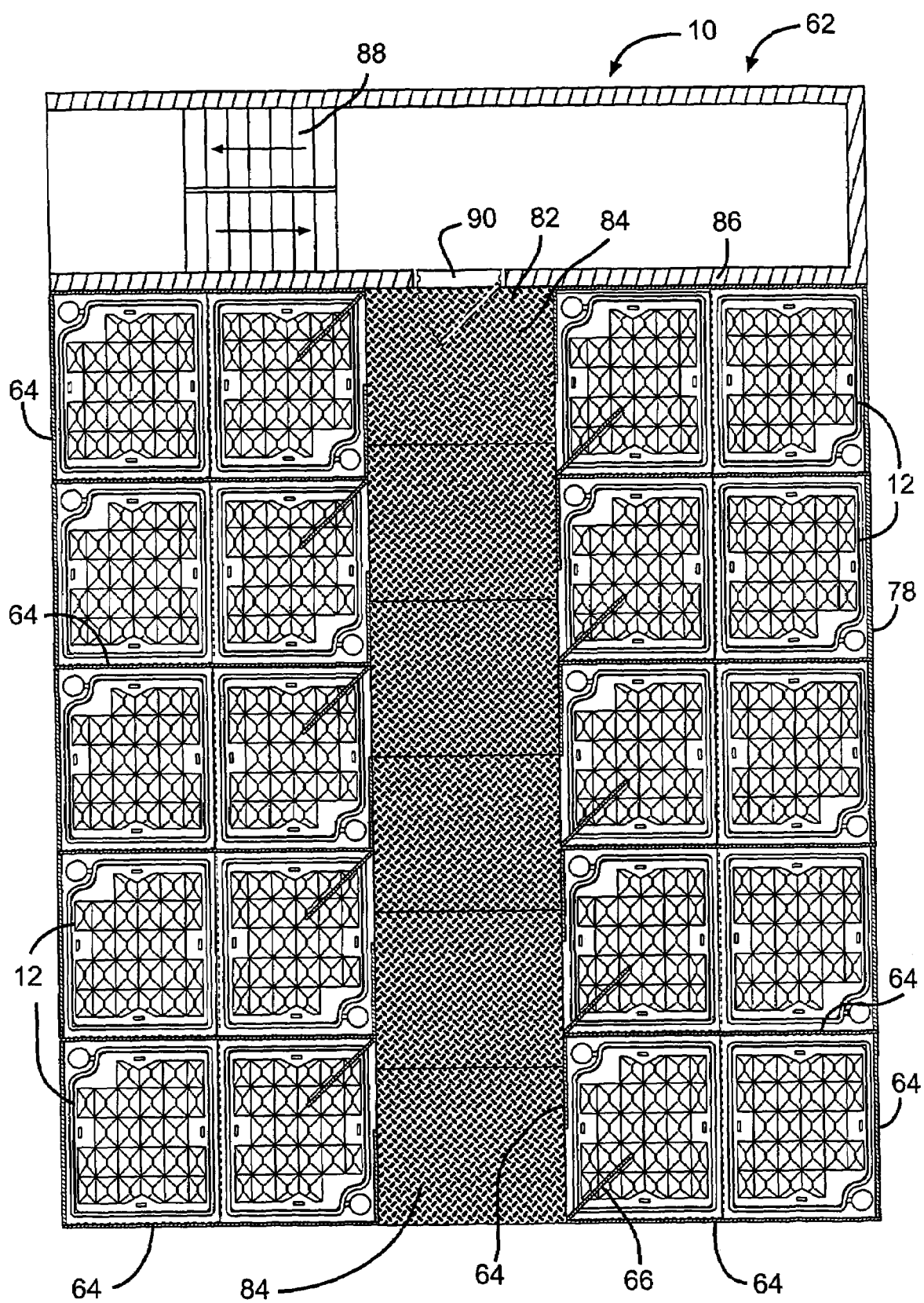
FIG. 12 is a view similar to FIG. 11 showing upper floor units and a walkway positioned on the walls and structural supports of the floor assembly.
Figure 13:
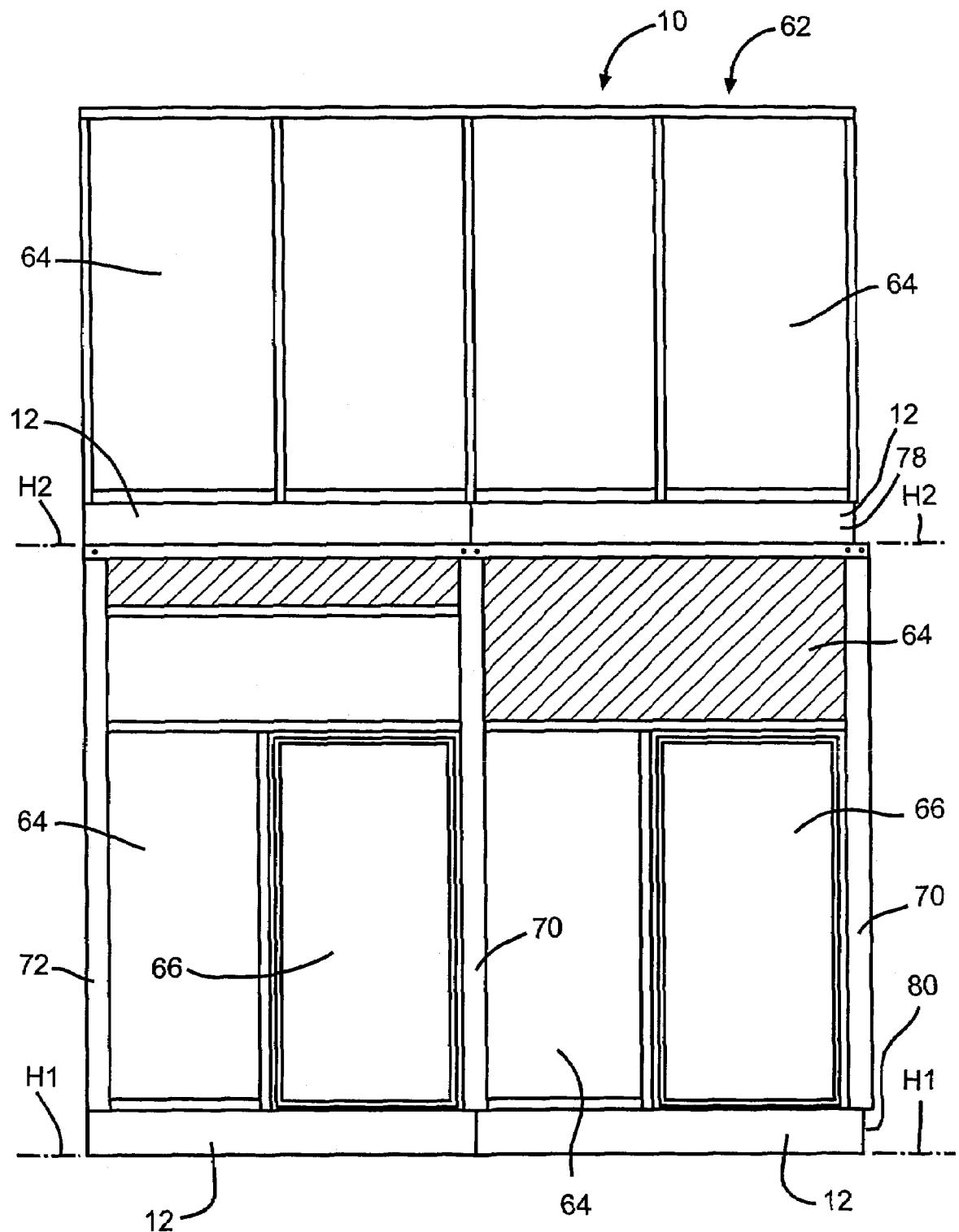
FIG. 13 is a front elevational view of a kennel system in which the floor units of the lower level are the same size as the floor units of the upper level.

Referring to FIGS. 11-13, the floor assembly 62 includes support members or angles 76 constructed of aluminum positioned horizontally and vertically in a grid adjacent to the tops of the walls 64. As shown in FIGS. 12 and 13, the angles 76 support an upper level 78 of floor units 12 over a lower level 80 of floor units 12. The angles 76 also support a walkway 82 that is constructed of plates 84. The plates 84 are preferably constructed of a durable and lightweight moldable material such as structural foam plastic or poured plastic. The plates 84 can also be constructed of metal. In the embodiment shown in FIGS. 11 and 12, the floor assembly 62 is positioned adjacent to and connected with an external support member or building wall 86. Stairs 88 are positioned next to the building wall 86 to provide access to the walkway 82 and thus the upper level 78. As shown in FIG. 12, the floor assembly 62 has walls 64, doors 66 and divider panels (not shown) as described above. There is also a door 90 positioned adjacent to the walkway 82.

Figure 14:
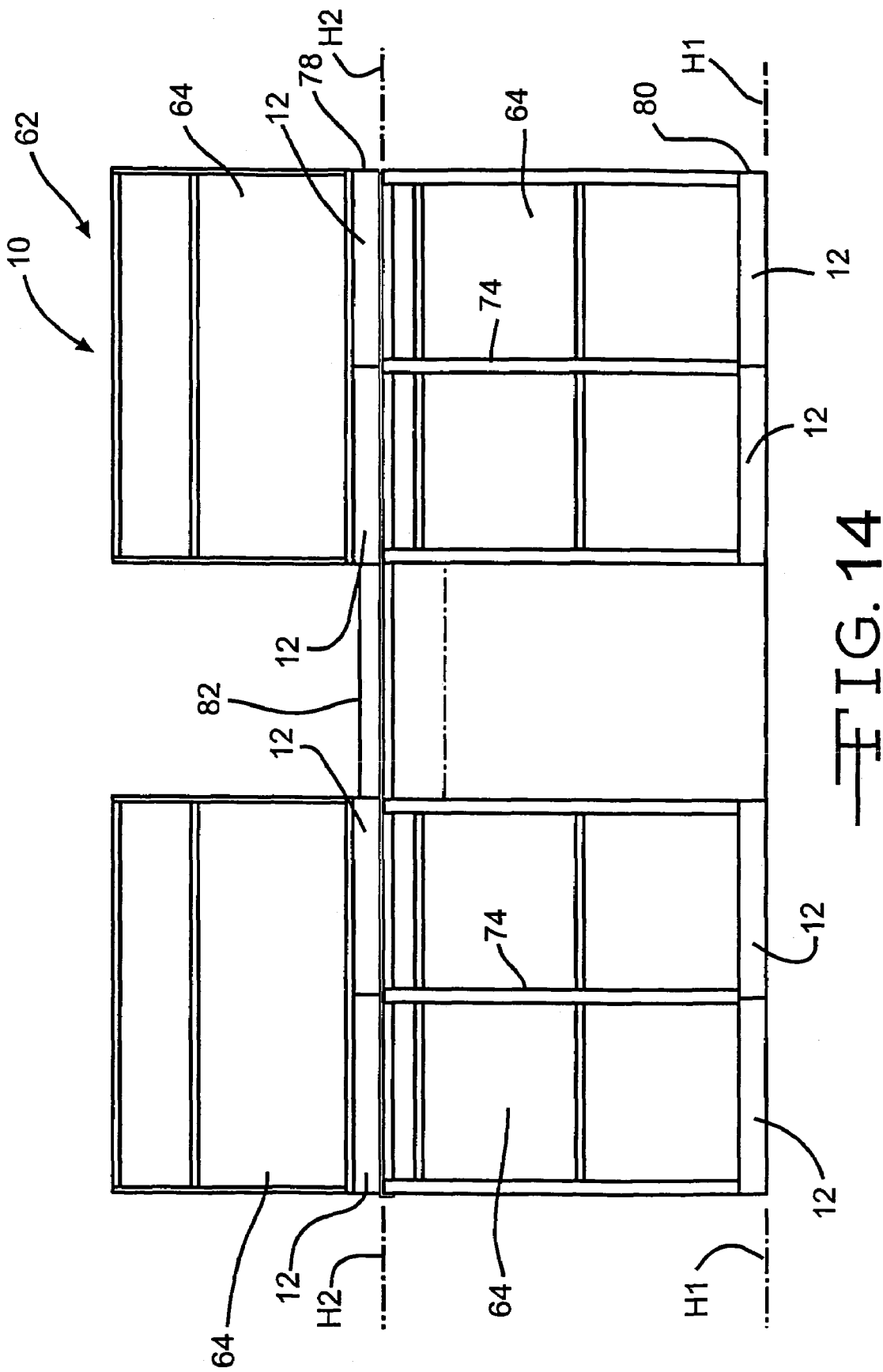
FIG. 14 is a side elevational view of the kennel system shown in FIG. 13.

As described above, the floor assembly 62 can include a single floor unit 12. The floor assembly 62 can also include at least two floor units 12 as shown in FIGS. 13-16. Referring to FIGS. 13 and 14, the floor assembly 62 has at least two floor units 12 positioned on a first horizontal plane H1 forming the lower level 80. The floor assembly 62 further includes at least two floor units 12 positioned on a second horizontal plane H2 above the lower level 80 to from the upper level 78.

Referring to FIGS. 13 and 14, the floor assembly 62 includes floor units 12 that are the same size. The floor assembly 62 further includes walls 64, doors 66, tee splines 70, corner splines 72 and side splines 74. As shown in FIG. 14, the floor assembly 62 includes a walkway 82, which is positioned adjacent to stairs 88 as shown in FIG. 12.

Figure 15:
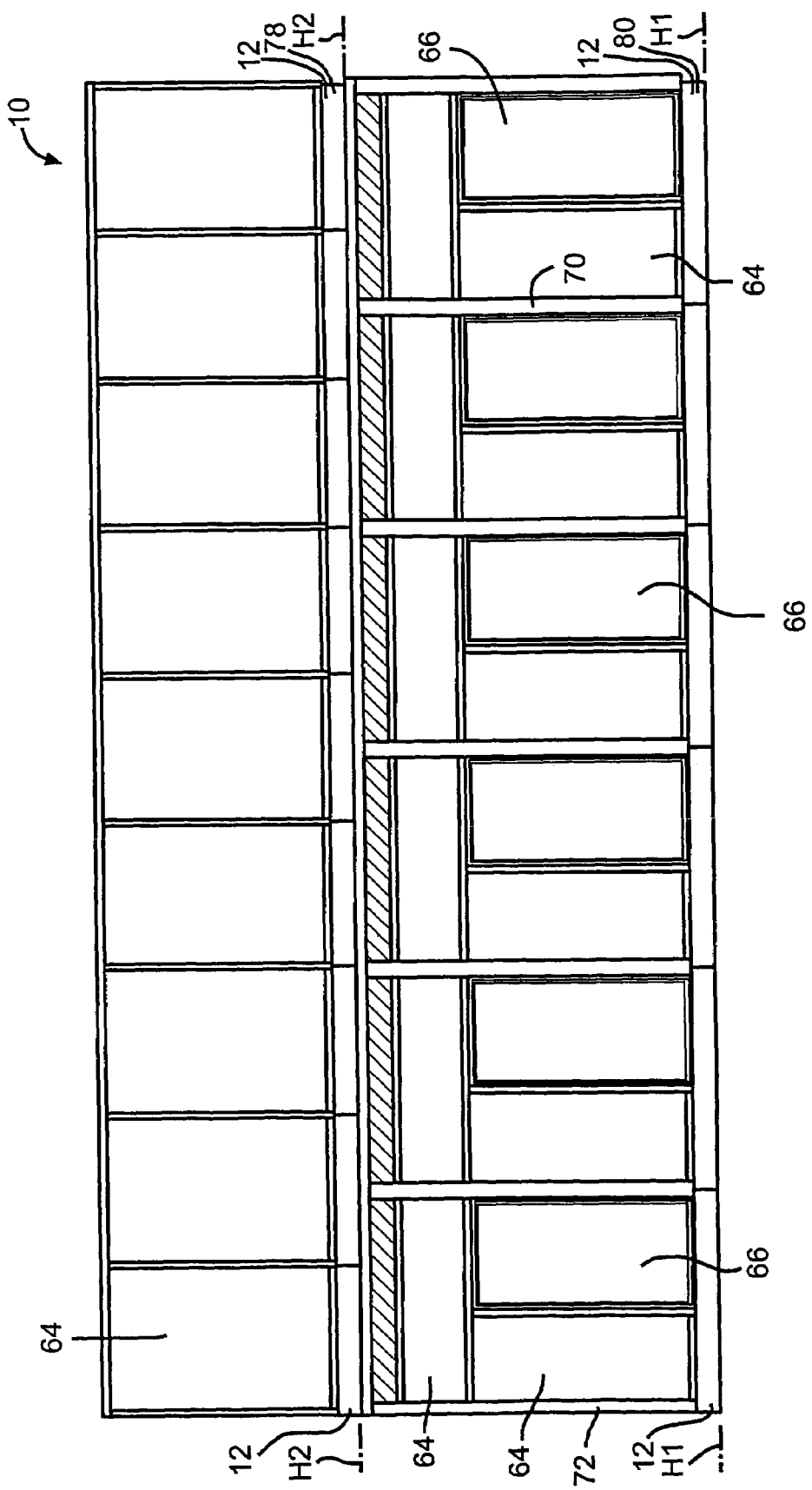
FIG. 15 is a front elevational view of an alternative embodiment kennel system in which the floor units of the lower level are a different size than the floor units of the upper level.
Figure 16:
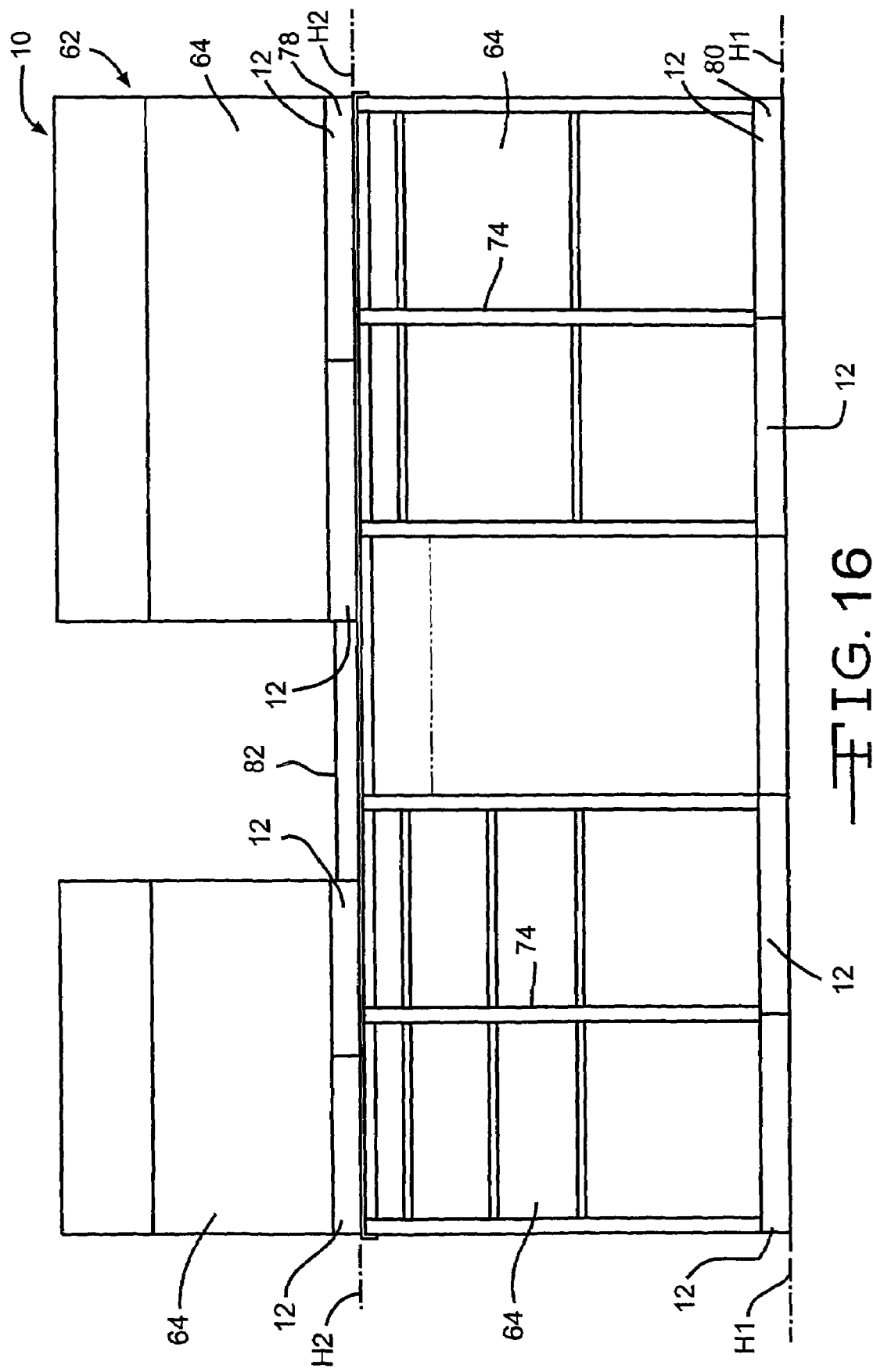
FIG. 16 is a side elevational view of the kennel system shown in FIG. 15.

An alternative embodiment is shown in FIGS. 15 and 16. This embodiment includes the elements as described above for the embodiment shown in FIGS. 13 and 14. However, in this embodiment, the floor units 12 of the upper level 78 are smaller than the floor units 12 of the lower level 80.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A kennel system comprising:
a floor assembly having at least one floor unit having a floor pan and a grate, the floor pan having a drain, an integral water receptacle and a trough for guiding fluid to the drain, the water receptacle having an overflow channel to the trough, the grate being positioned over the floor pan, the grate having a plurality of grate openings for the flow of fluid through the grate to the floor pan.

2. The kennel system of claim 1, wherein the floor pan is constructed of a moldable material.

3. The kennel system of claim 2, wherein the moldable material is plastic.

4. The kennel system of claim 3, wherein the plastic is structural foam plastic.

5. The kennel system of claim 3, wherein the plastic is poured plastic.

6. The kennel system of claim 1, wherein the floor pan has at least one sloped portion for guiding fluid to the trough.

7. The kennel system of claim 1, wherein the floor pan has at least one bearing for supporting the grate.

8. The kennel system of claim 1, wherein the grate is constructed of a moldable material.

9. The kennel system of claim 8, wherein the moldable material is plastic.

10. The kennel system of claim 9, wherein the plastic is structural foam plastic.

11. The kennel system of claim 9, wherein the plastic is poured plastic.

12. The kennel system of claim 1, wherein each of the grate openings is an elongated slot.

13. The kennel system of claim 12, wherein the slot is positioned adjacent to at least one sloped surface.

14. The kennel system of claim 1, wherein the grate has at least one handhold.

15. The kennel system of claim 1, wherein the floor assembly has at least two walls surrounding the at least one floor unit and at least one opening for access to the at least one floor unit.

16. The kennel system of claim 1, wherein the at least one floor unit includes at least two floor units positioned on the same horizontal plane.

17. The kennel system of claim 1, wherein the at least one floor unit includes at least two floor units positioned on different horizontal planes.

18. The kennel system of claim 1, wherein the at least one floor unit has at least one lower floor unit and at least one upper floor unit positioned above the at least one lower floor unit.

19. The kennel system of claim 18, wherein the floor assembly has at least two walls supporting the at least one upper floor unit.

20. The kennel system of claim 18, wherein the at least one lower floor unit and the at least one upper floor unit are the same size.

21. The kennel system of claim 18, wherein the at least one lower floor unit and the at least one upper floor unit are different sizes.

22. A kennel system comprising:
a floor assembly having at least one floor unit having a floor pan and a grate, the floor pan having a drain, an integral water receptacle and a trough for guiding fluid to the drain, the grate being positioned over the floor pan, the grate having a plurality of grate openings for the flow of fluid through the grate to the floor pan, the at least one floor unit having at least one lower floor unit and at least one upper floor unit positioned above the at least one lower floor unit and a walkway adjacent to the at least one upper floor unit.

23. The kennel system of claim 22, wherein the floor assembly has stairs adjacent to the walkway.

24. A kennel system comprising:
a plastic floor pan having a drain, an integral water receptacle and a trough for guiding fluid to a drain, the water receptacle having an overflow channel to the trough, the floor pan having at least two sloped portions for guiding fluid to the trough.

* * * * *